(12) United States Patent
Kemper

(10) Patent No.: US 6,478,104 B1
(45) Date of Patent: Nov. 12, 2002

(54) COLLAPSIBLE MOTOR DRIVEN VEHICLE

(76) Inventor: Joseph C. Kemper, 4759 Poseidon Pl., Lake Worth, FL (US) 33463

( * ) Notice: Subject to any disclaimer, the term of this patent is extended or adjusted under 35 U.S.C. 154(b) by 0 days.

(21) Appl. No.: 09/915,368

(22) Filed: Jul. 27, 2001

(51) Int. Cl.[7] .............................................. B62D 61/06
(52) U.S. Cl. ...................... 180/214; 180/211; 280/642
(58) Field of Search ................................ 180/210, 211, 180/213, 214, 217, 19.1, 19.3; 280/287, 639, 641, 642, 47.4, 47.41

(56) References Cited

U.S. PATENT DOCUMENTS

| | | |
|---|---|---|
| 1,074,748 A | 10/1913 | Satterlee |
| 2,661,672 A * | 12/1953 | Fairbanks |
| 2,771,145 A | 10/1956 | Peters |
| 3,229,782 A | 1/1966 | Hilton |
| 3,354,975 A * | 11/1967 | Stuart |
| 3,407,892 A | 10/1968 | Vosseller |
| 3,434,558 A | 3/1969 | Allen |
| 3,666,035 A | 5/1972 | Dudouyt |
| 3,910,368 A * | 10/1975 | Weber et al. .............. 180/26 R |
| 4,087,106 A | 5/1978 | Winchell |
| 4,087,108 A | 5/1978 | Winchell |
| 4,289,326 A | 9/1981 | Hawkes |
| 4,526,390 A | 7/1985 | Sholnik |
| 4,538,696 A * | 9/1985 | Carter ........................ 180/19.3 |
| 4,750,578 A | 6/1988 | Brandenfels |
| 4,934,638 A | 6/1990 | Davis |
| 5,249,636 A | 10/1993 | Kruse et al. |
| 5,715,625 A | 2/1998 | West, III |
| 5,749,424 A * | 5/1998 | Reimers ..................... 180/19.2 |
| 6,378,642 B1 * | 4/2002 | Sutton ......................... 180/208 |

* cited by examiner

Primary Examiner—Avraham Lerner
(74) Attorney, Agent, or Firm—Shlesinger, Arkwright & Garvey LLP

(57) ABSTRACT

This invention relates to a collapsible motor drive vehicle of tripod construction which is lightweight and collapsible for ease in storage and handling.

16 Claims, 5 Drawing Sheets

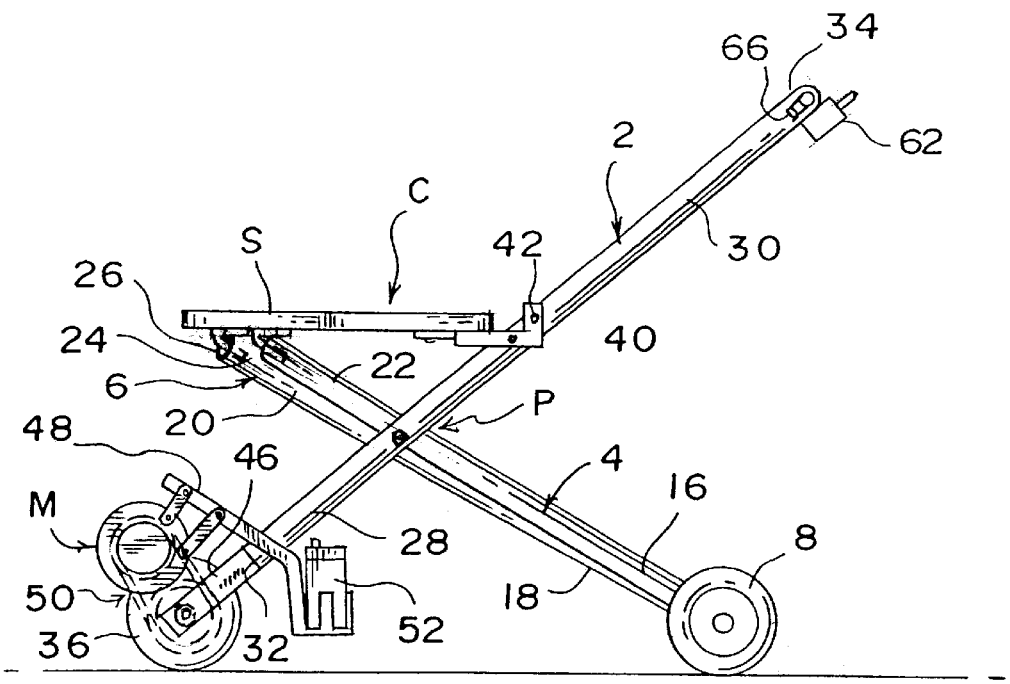
FIG_1
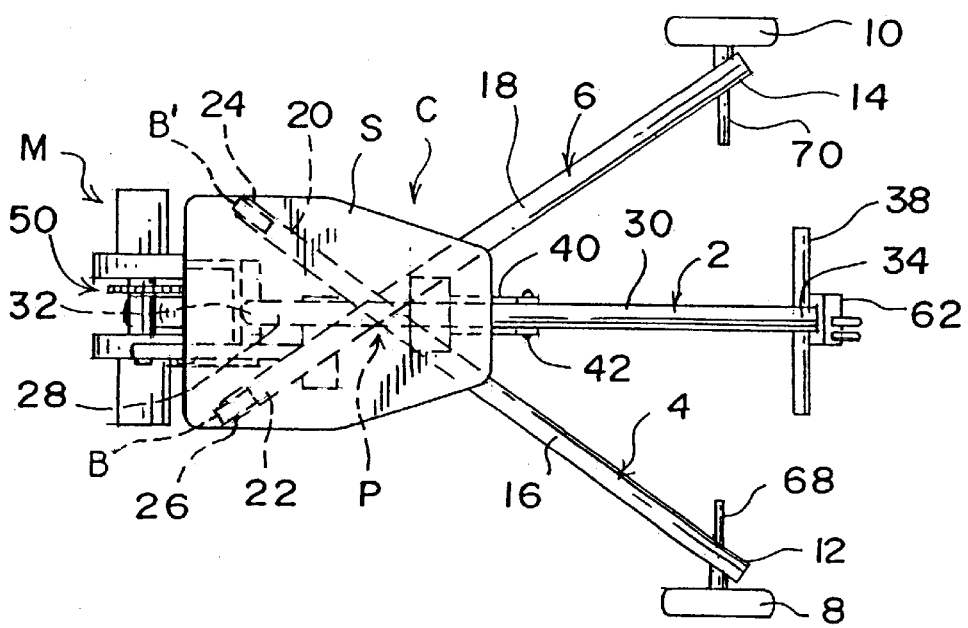
FIG_2

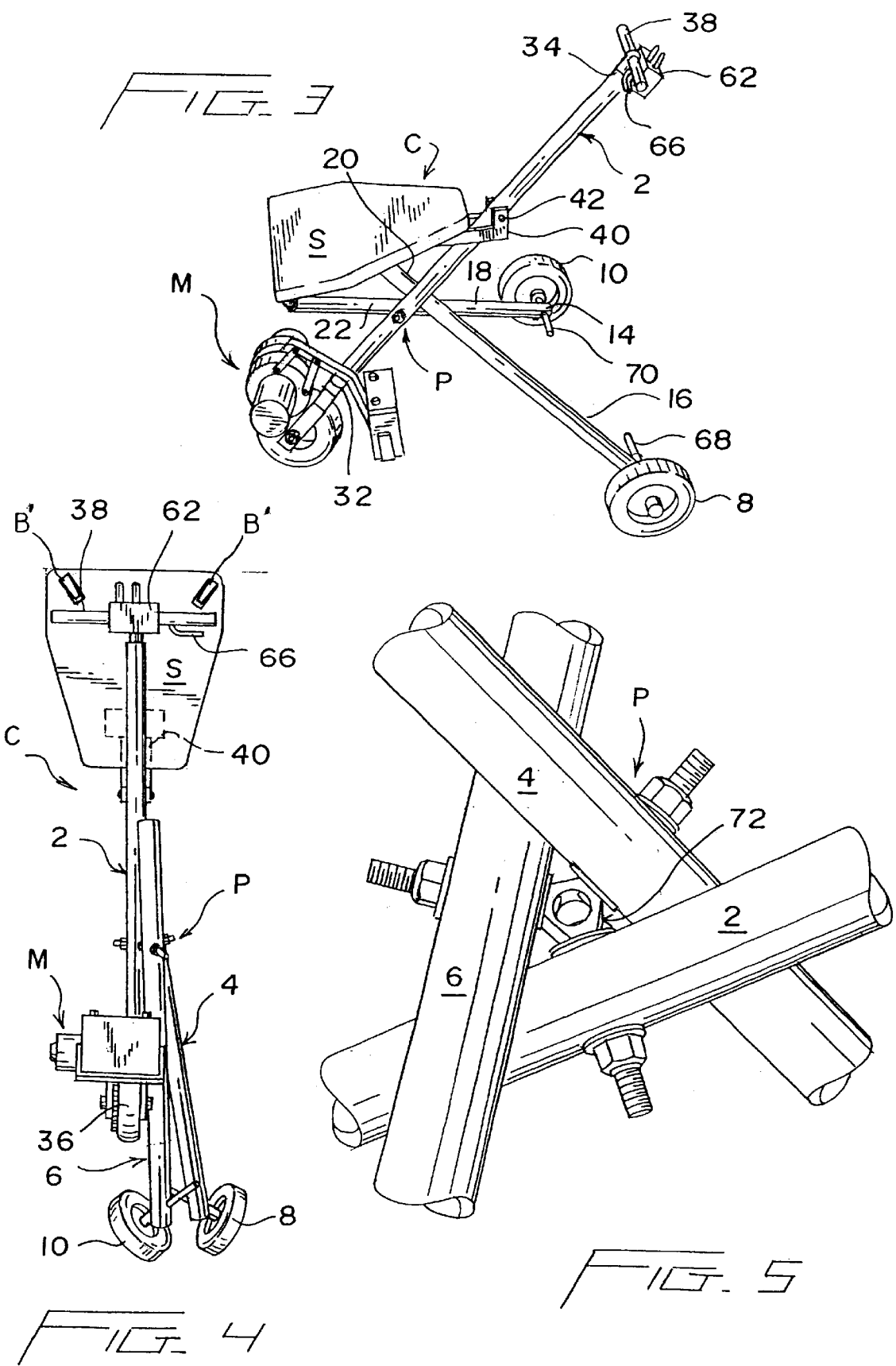

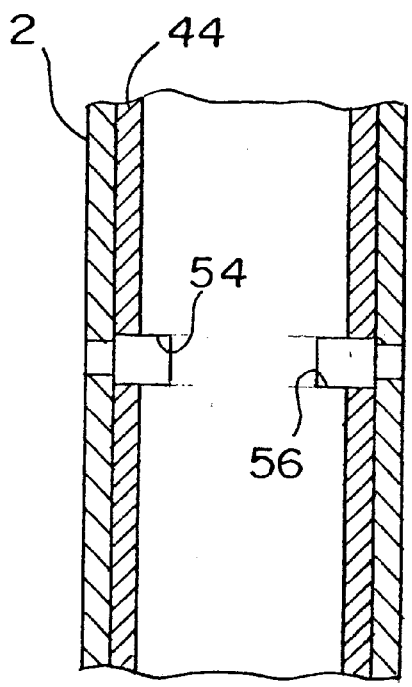
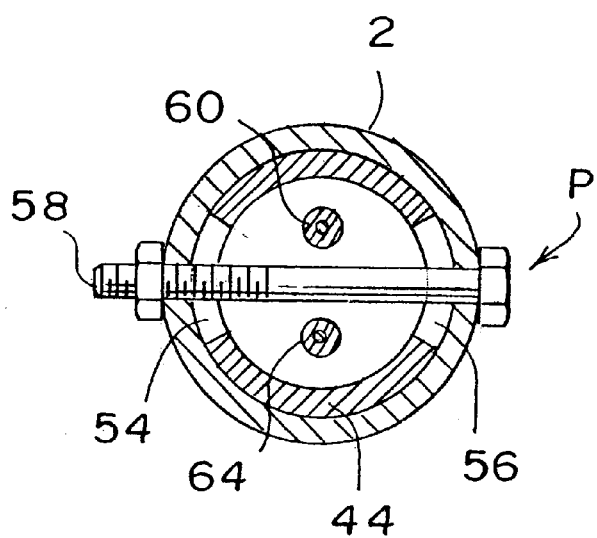

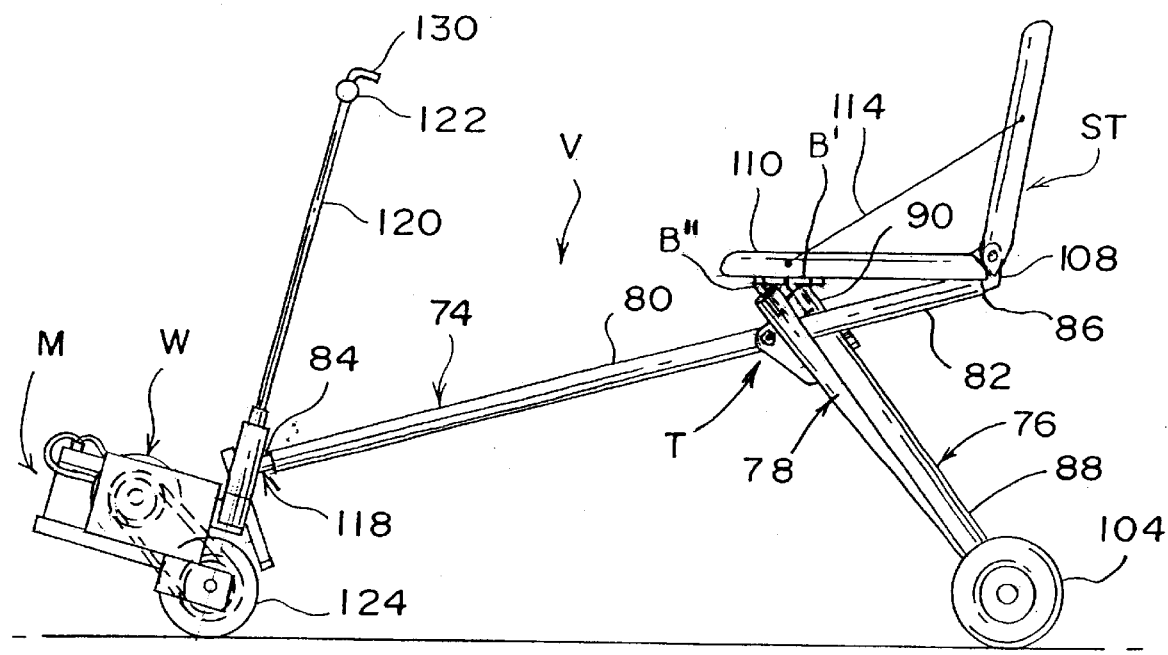
FIG_ 8
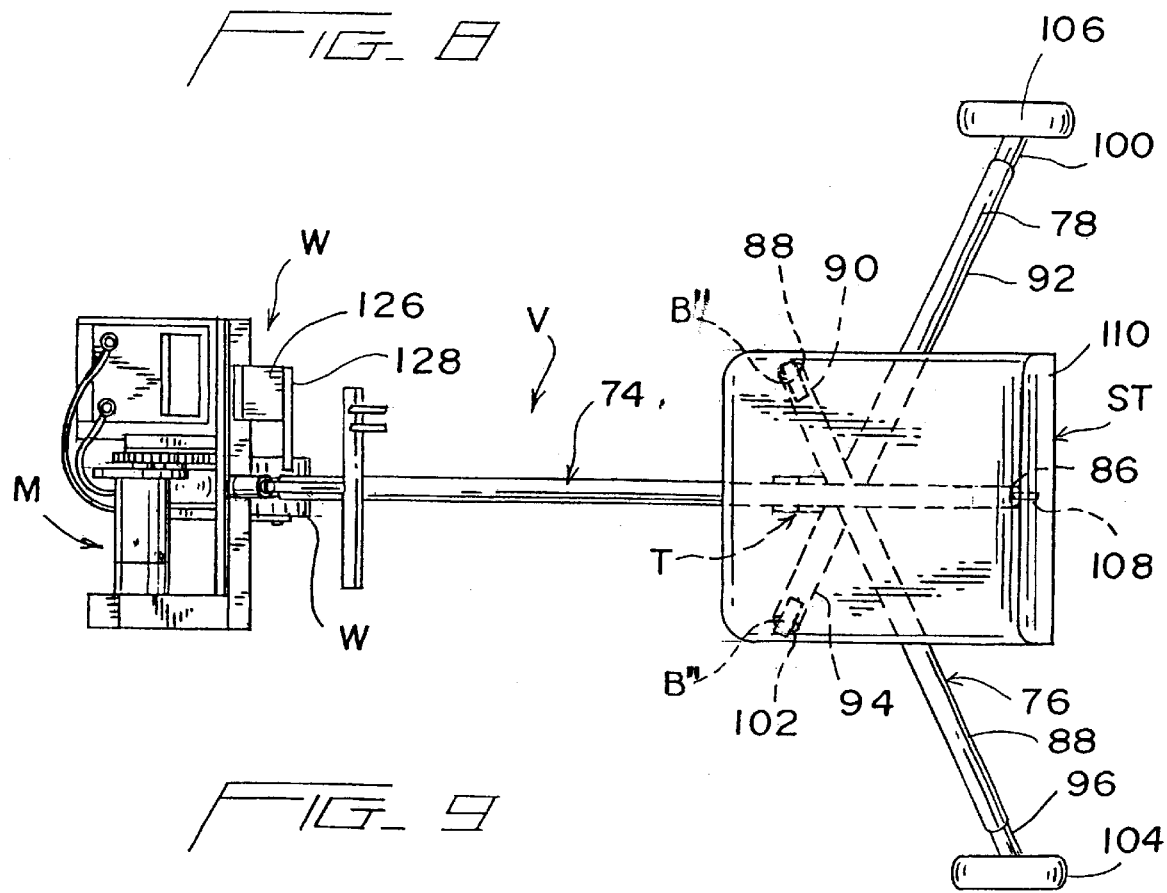
FIG_ 9

COLLAPSIBLE MOTOR DRIVEN VEHICLE

GENERAL DESCRIPTION

This invention relates to a collapsible motor drive vehicle having three legs and a seat supported by the three legs in tripod configuration with dual wheels either front or back and a single wheel motor driven which provides the tripod suspension for the seat and cooperates with the dual wheels.

HISTORICAL BACKGROUND

Tripod devices generally are known in the art of seat devices such as U.S. Pat. No. 4,934,638(Davis) and U.S. Pat. No. 5,715,625(West).

Motor driven three-wheeled devices of tripod configuration are general shown in U.S. Pat. No. 1,074,748(Satterlee), U.S. Pat. No. 3,434,558(Allen), U.S. Pat. No. 3,229,782 (Hilton), U.S. Pat. No. 4,087,108(Winchell), and U.S. Pat. No. 3,407,892(Vosseller).

Other typical tripod devices such as scooters U.S. Pat. No. 4,087,106(Winchell), U.S. Pat. No. 4,526,390(Skolnik) and U.S. Pat. No. 4,289,326(Hawkes) of the golf cart variety are well known.

Other three-wheeled vehicles with seats but not of tripod configuration have some related features including U.S. Pat. No. 5,249,636(Kruse et al.), U.S. Pat. No. 2,771,145(Peters) and U.S. Pat. No. 3,666,035(Dudouyt).

OBJECTS AND SUMMARY

It is an object of this invention to provide a collapsible motor drive vehicle which is lightweight and readily carried by an individual.

A further object of this invention is to provide a collapsible motor drive vehicle of rigid construction which can readily assembled with a minimum number of parts.

A further object of this invention is to provide a collapsible motor driven vehicle with a handle bar steering mechanism in which the drive wheel can be front mounted or rear mounted.

Yet another object of this invention is to provide a collapsible motor driven vehicle of tubular frame configuration in which the seat rests on a tripod frame for strength and support.

Yet another object of this invention is to provide a collapsible motor driven vehicle with a frame which is provided with a central pivot so that the three legs of the tripod will provide strength to the vehicle when driven and minimum space when the vehicle is collapsed.

Yet another object of this invention to provide a collapsible motor driven vehicle with a readily removable motor drive mechanism which may be electric or gasoline as desired.

A further object of this invention includes a lightweight collapsible motor driven vehicle which will enable the driver to manipulate the vehicle by simple means for accelerating and braking the vehicle.

In summary this invention relates to a collapsible motor driven vehicle of rigid construction capable of bearing heavy loads at a reasonable transport speed.

The following is a detailed description of the invention including the accompanying drawings which are as follows:

FIG. 1 is a side elevational view of the invention;

FIG. 2 is a top plan view of the invention with portions shown in phantom lines;

FIG. 3 is a perspective view of the vehicle;

FIG. 4 is the vehicle shown collapsed;

FIG. 5 is a broken away top plan view of the tripod support bolt and nut bracket;

FIG. 6 is an enlarged cross-sectional view of a portion of the tubing which carries the inner sleeve of the steering mechanism;

FIG. 7 is a cross-sectional view of the tubing with the nut and bolt in place permitting the internal tubing of the steering mechanism to be rotated within limits about the bolt passing through the outer tube which supports the inner steering control mechanism;

FIG. 8 is a side elevational view of a modified form of the invention;

FIG. 9 is a top plan view of the modified configuration of the invention;

FIGS. 1 THROUGH 7

Figure 10:
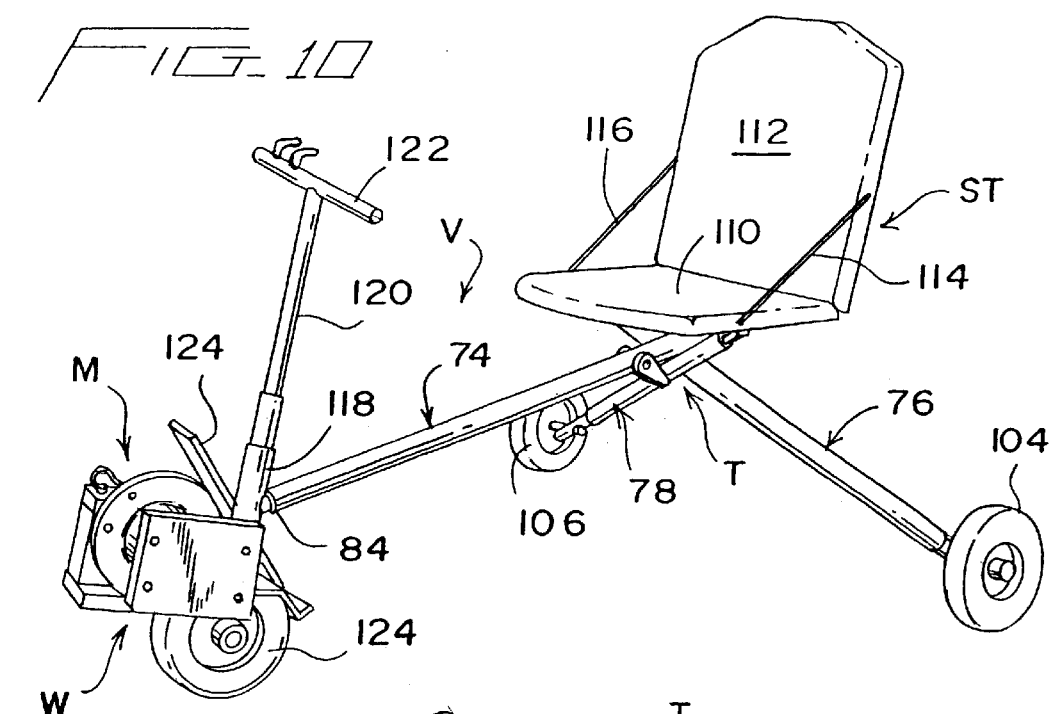
FIG. 10 is a perspective view of the modified form of the invention.

In FIGS. 1 through 3, the cart or vehicle C is constructed of three tubular members 2, 4, and 6. The members 2, 4, and 6 may be of plastic wood or metal and are not necessarily tubular. Members 4 and 6 are substantially of the same length and are pivotally connected at pivot P with the member 2. Wheels 8 and 10 are connected to the tubular members 4 and 6 at the ends 12 and 14 of the first portion 16 and 18 of the tubular members 4 and 6 respectively. The tubular members 4 and 6 have a second portion 20 and 22 located above the pivot P. Members 4 and 6 have ends 24 and 26. Member 2 has a first portion 28 extending downwardly from the pivot P and a second portion 30 extending upwardly from the pivot P. The first portion 28 has an end 32 and a second portion 30 has an end 34. A wheel 36 is located on end 32 and a handlebar 38 is located on the end 34.

A seat S rests on second portions 20 and 22 of legs 4 and 6 and second portion 30 of leg 2. Brackets B' secured to seat S lock the legs 4 and 6 from shifting. A bracket 40 is mounted on second portion 30 and connected to seat S. The bracket 40 pivots on pivot 42 so that it may be raised upwardly when the cart or vehicle C is collapsed.

The handle 38 is mounted on a sleeve 44 in the tubular member 2 as best shown in FIGS. 6 and 7. The sleeve extends from the end 34 of the tubular member 2 to the opposite or lower end 32. The sleeve 44 is connected to a fork member 46 which supports the wheel 36. A support bracket 48 supports the motor and motor mechanism M which drives the wheel 36 by means of a belt and gear mechanism 50. The bracket 48 also supports a battery 52.

The bracket 48 is otherwise secured to the fork 46 by means such as bolts or welding(not shown).

The tubular member 44 is slotted as at 54 and 56 so as to receive a bolt 58 which acts as the pivot P. Similarly pivot 42 is a bolt similar to bolt 58 and extends through both the sleeve 44 and the tubular member 2. The sleeve 44 has additional slots similar to slots 54 and 56. It will be noted that the slots 54 and 56 permit rotation of the sleeve 44 in the tubular member 2 so as to turn the wheel left or right a substantial angular distance of up to about 90 degrees if necessary, in order to permit sufficient steering capabilities to the operator of the handle 38. As shown in FIG. 7, a cable 60 runs through the sleeve 44 to connect to outer controls 62 associated with the handle 38, so as to be able to turn the motor on and off and to increase or decrease the speed of the belt and gear mechanism 50. Cable 64 extends from the handle 38 which is attached to a standard brake caliper on the wheel 36(not shown). A brake handle grip 66 on the handle bar 38 is connected to cable 64 so that pressure can be applied to the caliper brake(not shown) on the wheel 36.

The operator sits on the seat S straddling the leg 2 with the operators feet positioned on the footrests 68 and 70 best shown in FIGS. 2 and 3.

It will now be observed in FIG. 4 that the cart or vehicle C can be collapsed for ease in carrying by raising the seat S and folding the legs 2, 4, and 6 inwardly. As best shown in FIG. 5, the pivot P comprises a tri-bolt and nut unit 72 which permits the folding of the legs 2, 4 and 6 when the cart or vehicle C is to be stored. Similarly the bolt and nut unit 72 permits extension of the legs 2, 4 and 6 for positioning downward of the seat S which will then rest on second portions 20, 22 and 30. It will now be obvious that the operator resting his hands on the handle bar 38 can control his speed of the vehicle or cart C and brake the cart of vehicle C as necessary.

FIGS. 8 THROUGH 12

In FIGS. 8, 9 and 10 the vehicle or cart V includes tubular members 74, 76 and 78. Members 76 and 78 are substantially the same length. The members 74, 76 and 78 are pivotally connected at T. Member 74 has a first portion 80 and a second portion 82. First portion 80 has an end 84 and second portion 82 has an end 86. Tubular member 76 has a first portion 88 and a second portion 90 and tubular member 78 has a first portion 92 and a second portion 94. The first portion 88 of tubular member 76 has an end 96 and the second portion has an end 98. The first portion 92 of tubular member 78 has an end 100 and the second portion 94 has and end 102. Ends 96 and 100 support wheels 104 and 106. A foldable seat ST is pivotably connected by a bracket 108 mounted on tubular member 74 at the end of the second portion 86. The tubular members or legs 74, 76 and 78 at their second portions 82, 90 and 94 support the seat ST. The seat ST has a bottom 110 and a back 112 which is foldable down on the bottom 110. Support cords 114 and 116 limit the backward movement of the back 112. Brackets B" secured to seat ST lock the legs 76 and 78 from shifting.

Figure 12:
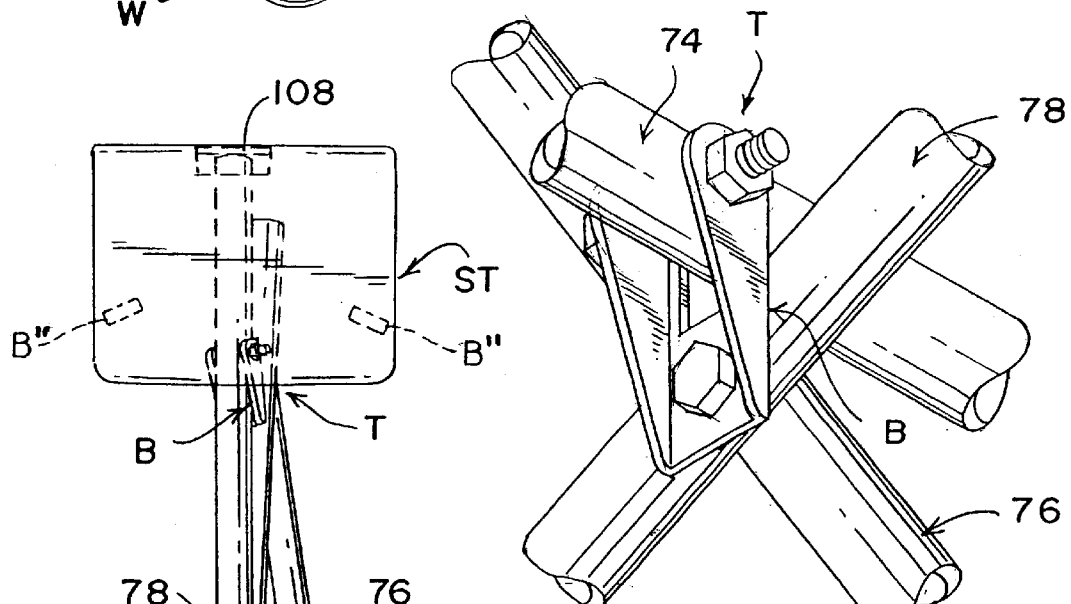
FIG. 12 is a fragmentary enlarged perspective view of the pivot mechanism of the modified invention.
Figure 11:
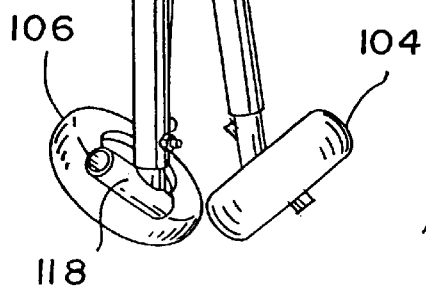
FIG. 11 is fragmentary side elevation view showing a portion of the invention collapsed.

In FIG. 12, the pivot T includes a bolt device B which connects the tubular members or legs 74, 76 and 78 and permits them to be folded as illustrated in FIG. 11. A socket support 118 fits into the tubular member 74 at the end 84. The socket member 118 supports the handle bar shaft 120 to which is connected a handle bar 122. The handle bar shaft 120 connects to a wheel and motor mount W which supports a wheel 124 which is driven by a motor M which may either be gasoline or electric.

On the wheel and motor mount W, a foot pedal 126 is provided. The foot pedal 126 is substantially centrally pivoted so that the upper portion when depressed will cause acceleration and the lower portion when depressed will cause braking engagement of a friction arm 128 on the wheel W as best shown in FIG. 9. Ignition and on/off switch means 130 is provided on handle bar 122. Cables or the like extend down through the handle bar shaft 120 from the ignition and on/off switch means 130 to the motor M. It is obvious that a horn or like mechanism can be provided on the vehicle(not shown).

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A collapsible motor driven vehicle comprising:
   a) three legs each having first and second portions
   b) two of said three legs being substantially equal in length and said first and second portions having an end;
   c) said end of said first portion of said two of said three legs having wheels connected thereto;
   d) the third leg of said three legs having an end on each of said first and second portions;
   e) said end of said third leg first portion having connected thereto a drive wheel;
   f) pivot means connecting said three legs intermediate their first and second ends;
   g) a foldable seat supported by said second portion of said three legs and connected to said third leg
   h) said third leg supporting and connecting to said first portion, a steering mechanism, a motor, an accelerator for said motor and a brake;
   i) a steering handle associated with said steering mechanism; and
   j) said three legs having a first open tripod riding position and a second collapsed position.

2. A collapsible motor driven vehicle as in claim 1 and wherein:
   a) said legs are tubular.

3. A collapsible motor driven vehicle as in claim 1 and wherein:
   a) said third leg is longer than said two of said three legs.

4. A collapsible motor driven vehicle as in claim 3 and including:
   a) a socket at said end of said first portion of said third leg for rotatably receiving said steering mechanism.

5. A collapsible motor driven vehicle as in claim 1 and including:

a) a rocker pedal having first and second positions for engaging said accelerator in said first position and engaging said brake in said second position.

6. A collapsible motor driven vehicle as in claim 2 and wherein:

a) said third leg includes a rotatable slotted sleeve connected to said steering handle and positioned within said tubular third leg.

7. A collapsible motor driven vehicle as in claim 1 and wherein:

a) said drive wheel is a rear wheel.

8. A collapsible motor driven vehicle as in claim 1 and wherein:

a) said drive wheel is a front wheel.

9. A collapsible motor driven vehicle as in claim 1 and wherein:

a) said seat folds towards said handle.

10. A collapsible motor driven vehicle as in claim 1 and wherein:

a) said motor is mounted in front of said steering mechanism.

11. A collapsible motor driven vehicle as in claim 1 and wherein:

a) said motor is mounted behind said steering mechanism.

12. A collapsible motor driven vehicle as in claim 1 and wherein:

a) said seat includes a foldable back rest.

13. A collapsible motor driven vehicle as in claim 1 and wherein:

a) said motor is electrically driven.

14. A collapsible motor driven vehicle as in claim 1 and wherein:

a) said motor is gasoline powered.

15. A collapsible motor driven vehicle as in claim 1 and wherein:

a) said steering mechanism is axially aligned with said third leg.

16. A collapsible motor driven vehicle as in claim 1 and wherein:

a) said steering mechanism is at a transverse angle to said third leg.

\* \* \* \* \*